(12) United States Patent
Goodjohn (10) Patent No.: US 6,363,620 B1
(45) Date of Patent: Apr. 2, 2002

(54) APPARATUS AND METHOD FOR MEASURING THE LOFT ANGLE AND THE LIE ANGLE OF A GOLF CLUB

(75) Inventor: Andrew J. Goodjohn, Vista, CA (US)

(73) Assignee: Callaway Golf Company, CA (US)

( * ) Notice: Subject to any disclaimer, the term of this patent is extended or adjusted under 35 U.S.C. 154(b) by 0 days.

(21) Appl. No.: 09/620,815

(22) Filed: Jul. 21, 2000

(51) Int. Cl.[7] .................................................. G01B 1/00
(52) U.S. Cl. ........................ 33/508; 473/282; 473/409; 33/549
(58) Field of Search .......................... 33/508, 534, 535, 33/549, 551, 552, 553, 554, 573; 473/282, 409, 287, 290; 73/65.03

(56) References Cited

U.S. PATENT DOCUMENTS

| | | | | |
|---|---|---|---|---|
| 2,546,426 A | * | 3/1951 | Bryant | 33/508 |
| 3,822,477 A | * | 7/1974 | Collins | 33/508 |
| 4,094,072 A | * | 6/1978 | Erb | 33/508 |
| 4,245,392 A | * | 1/1981 | Heller | 33/508 |
| 4,620,431 A | * | 11/1986 | Muldoon | 33/508 |
| 4,622,836 A | * | 11/1986 | Long et al. | 33/508 |
| 4,875,293 A | * | 10/1989 | Wakefield | 33/508 |
| 5,105,550 A | * | 4/1992 | Shenoha | 33/508 |
| 5,421,098 A | | 6/1995 | Muldoon | |
| 5,527,034 A | | 6/1996 | Ashcraft et al. | |
| 5,596,812 A | * | 1/1997 | Solheim | 33/508 |
| 5,884,409 A | | 3/1999 | Muldoon | |

FOREIGN PATENT DOCUMENTS

| | | | | |
|---|---|---|---|---|
| GB | 2269022 A | * | 1/1994 | A63B/53/00 |
| JP | 58220378 A | * | 6/1985 | G01B/11/26 |
| JP | 02193001 A | * | 7/1990 | 33/508 |
| JP | 04352860 A | * | 6/1994 | A63B/53/00 |
| JP | 09028840 A | * | 2/1997 | A63B/53/00 |
| JP | 2001129128 A | * | 11/1999 | A63B/53/00 |

* cited by examiner

Primary Examiner—Diego Gutierrez
Assistant Examiner—Mirellys Jagan (57) ABSTRACT

The present invention is an apparatus and method for measuring the loft angle and the lie angle of a golf club. The present invention allows for comparisons to known values, and removes operator bias from the measurements. The apparatus has an encoder assembly with a loft mechanism and a lie mechanism. The encoder assembly is capable of five axial movements. The apparatus has securing means for securing a golf club in an address position during measurement of the loft angle and the lie angle.

14 Claims, 8 Drawing Sheets

APPARATUS AND METHOD FOR MEASURING THE LOFT ANGLE AND THE LIE ANGLE OF A GOLF CLUB

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to measuring devices for golf clubs. More specifically, the present invention relates to a method and device for measuring the loft angle and lie angle of a golf club.

2. Description of the Related Art

As golf clubs are designed with a given angle between the club-face and the vertical plane (loft angle) and also an angle between the shaft centerline and the horizontal plane (lie angle), there has always been the necessity for a method of measuring these angles.

Almost all of the devices designed to measure these angles have consisted of a clamping device to hold the club-head in a position such that the plane of the sole of the club is as close to parallel with the horizontal plane as possible. Protractors (or protractor-like attachments) have been used to measure the angle of the shaft relative to the face plane (to give loft angle) and to measure the angle of the shaft relative to the horizontal plane. This method, although relatively effective and commonly used (and accepted) in the golf industry, has a number of shortcomings that can adversely affect the quality of the measurements taken.

Firstly, the outside of the shaft is used as the reference measuring arm rather than the shaft center-line. As all shafts have a certain amount of taper to them, the outside of the shaft is always at a slight angle to the shaft center-line, therefore introducing a slight "offset angle" which will very depending on the shaft design. Secondly, the set-up of the club head within the clamping device is heavily reliant on human input and therefore influenced by individual bias. As almost all golf clubs have a certain amount of curvature to the sole, it can be very difficult to align the sole plane with the horizontal. Therefore, the grooves of the club face tend to be used, combined with an alignment aid on clamping device, to achieve a consistent clamped position. This methodology lends itself to introducing human bias and a difference of measurements from operator to operator. Thirdly, the measurement protractors themselves tend to be of the analog variety and have a maximum accuracy of +/−0.5° for a skilled operator which reduces the accuracy and consistency of measurements, especially from operator to operator. Finally, while iron clubs are relatively easy to clamp in position, the design of metal woods is such that holding the club in a consistent orientation by clamping the club is very difficult. Therefore, a different tool is required to measure metal woods and this tool tends to be less sophisticated in measurement method and even more dependent on the familiarity of the operator with the tool. Therefore there can be limitations in trying to correlate loft and lie angles measured for metal woods with those measured for irons.

In summary, although there are recognized tools and methods for the measurement of loft and lie angles, there are inherent inaccuracies and losses in consistency associated with their use and the training of the operator.

BRIEF SUMMARY OF THE INVENTION

The present invention provides an efficient and accurate means for measuring the loft angle and the lie angle of a golf club. The present invention also allows for the loft angle and the lie angle to be compared to known values for a particular golf club.

One aspect of the present invention is a method for measuring the loft angle and the lie angle of a golf club having a plurality of scorelines. The method begins with placing a golf club within a measuring device. The plurality of scorelines of the golf club face toward an encoder of the measuring device. Next, a plurality of lie pins of the encoder are aligned with a scoreline of the plurality of scorelines. Next, the plurality of lie pins engage the surface of the scoreline. Next, the lie angle of the golf club is measured and recorded electronically. Next, a first loft pin of the encoder is aligned with at least one scoreline of the plurality of scorelines and a second loft pin is aligned with the face of the golf club. Next, the first loft pin engages the surface of the scoreline, and the second loft pin engages the surface of the face of the golf club. Finally, the loft angle of the golf club is measured and recorded electronically.

Another aspect of the present invention is an apparatus for measuring loft and lie angles of a golf club. The apparatus includes a platform, a securing means, an encoder and a transmitting means. The securing means secures a golf club in an address position. The securing means is disposed on the platform. The encoder has a loft angle measurement mechanism and a lie angle measurement mechanism. The encoder is capable of five axial movements for engagement of each of the loft angle measurement mechanism and the lie angle measurement mechanism with the club face. The loft angle mechanism has a plurality of loft pins and the lie angle mechanism has a plurality of lie pins. The transmitting means transmits the loft angle and lie angle measurements for recordation on the apparatus or on computer.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
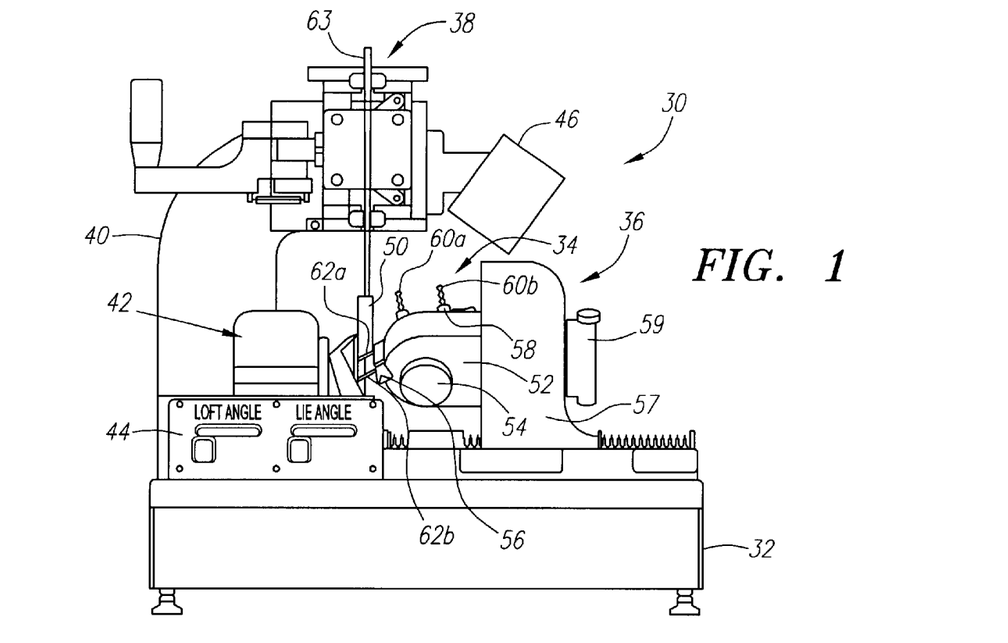
FIG. 1 is a schematic front view of the apparatus of the present invention.
Figure 1A:
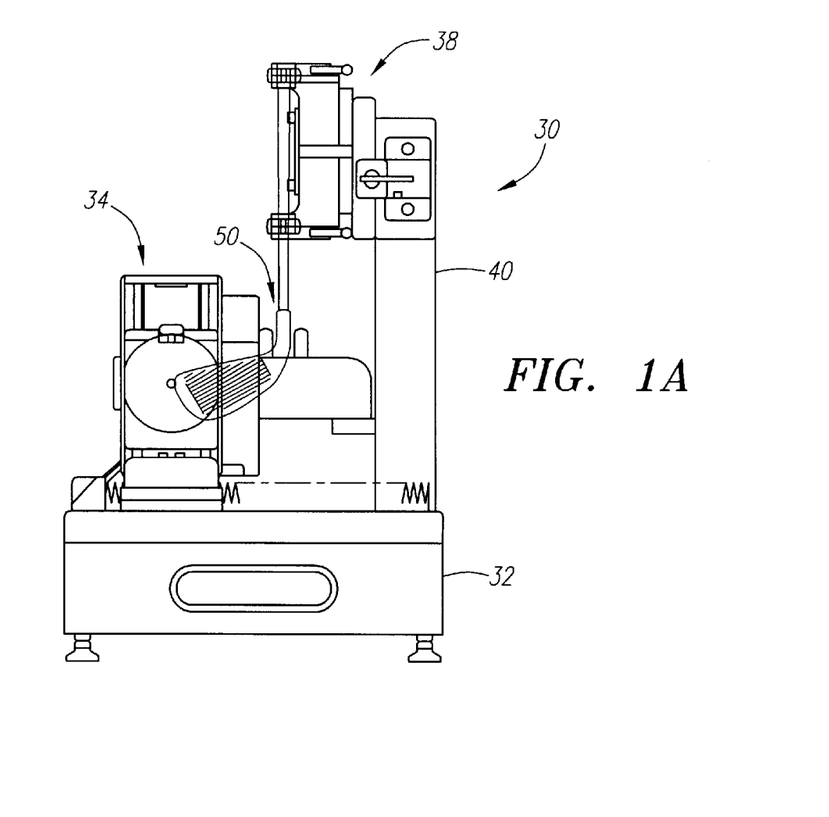
FIG. 1A is a side view of FIG. 1.
Figure 2:
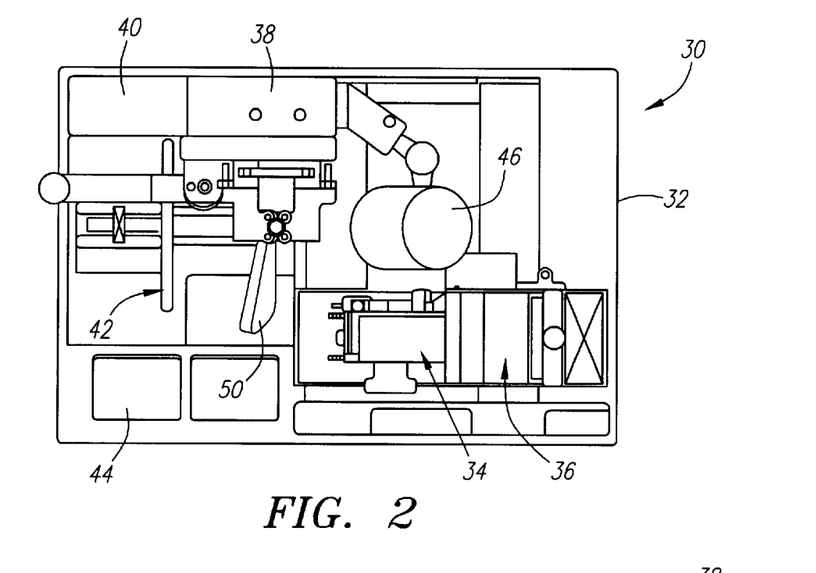
FIG. 2 is a top plan view of FIG. 1.

As shown in FIGS. 1–2, an apparatus for measuring the loft angle and the lie angle is generally designated 30. The apparatus includes a base platform 32 for mounting of the mechanical components thereon and the electrical components therein. The apparatus 30 also has an encoder assembly 34 that has a sliding mechanism 36 that is mounted to the platform 32. The apparatus 30 also has a golf club securing mechanism 38 for retaining a golf club shaft therein. The golf club securing mechanism is mounted on an arm 40 that is mounted on the platform 32. An adjustable back stop 42 assists the golf club securing mechanism 38 in maintaining a golf club 50 in an address position for proper measurement of the loft angle and the lie angle of the golf club 50. The apparatus 30 further includes a light emitting diode ("LED") display 44 for electronically and immediately displaying the loft angle and lie angle measurements, and an illumination device 46 for illuminating the golf club 50, which is mounted to the securing mechanism 38.

The encoder assembly 34 has a forward housing 52 to which a loft rotation knob 54 is connected for oscillation control of a loft measurement mechanism 58. The encoder assembly 34 also has a rearward housing 57 to which a lie rotation knob 59 is connected for oscillation control of a lie measurement mechanism 56. The lie measurement mechanism 56 has a plurality of lie pins 62a and 62b, and the loft measurement mechanism 58 has a plurality of loft pins 60a and 60b.

Figure 3:
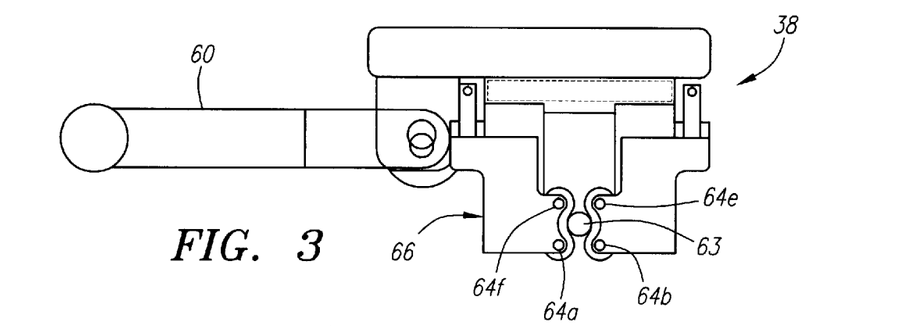
FIG. 3 is an isolated top plan view of the shaft securing mechanism of the apparatus of the present invention.
Figure 4:
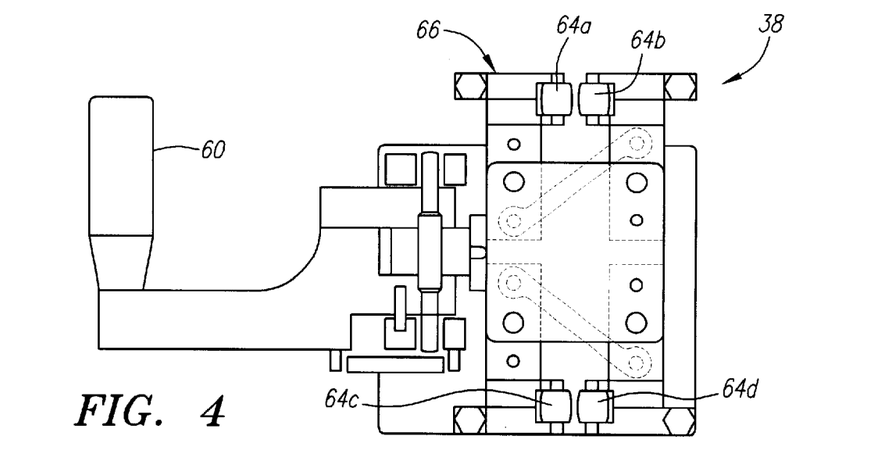
FIG. 4 is an isolated front view of the shaft securing mechanism of the apparatus of the present invention.

As shown in FIGS. 3 and 4, the golf club securing mechanism 38 has a clamp handle 60 locking and unlocking a shaft 63 of a golf club 50 in place within the securing mechanism 38. A plurality of rollers 64a–h retain the shaft 62 within the securing mechanism 38. The plurality of rollers 64a–f are mounted to a clamp assembly 66, which is actuated by the clamp handle 60.

Figure 5:
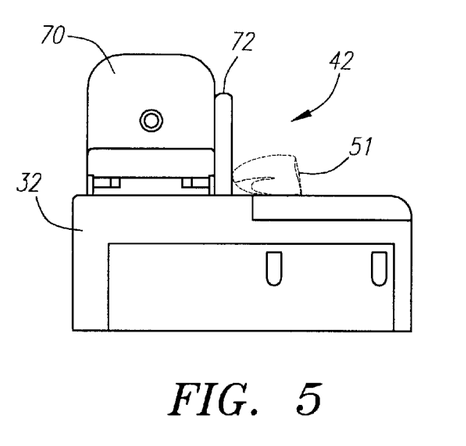
FIG. 5 is an isolated front view of the adjustable stop plate of the apparatus of the present invention.
Figure 6:
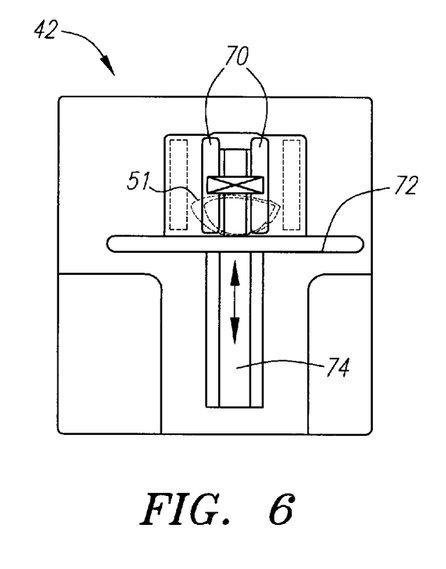
FIG. 6 is an isolated top view of the adjustable stop plate of the apparatus of the present invention.

As shown in FIGS. 5 and 6, the adjustable back stop assembly 42 includes a support plates 70 and an engagement plate 72 that is moved along guide 74 for bracing a golf club head 51. The securing mechanism 38 and the adjustable back assembly 42 allow for the golf club 50 to be retained firmly in a position that is similar to the position the golf club 50 would be in if addressing a golf ball. This allows for a precise measurement of the loft angle and lie angle of the golf club 50.

Figure 7:
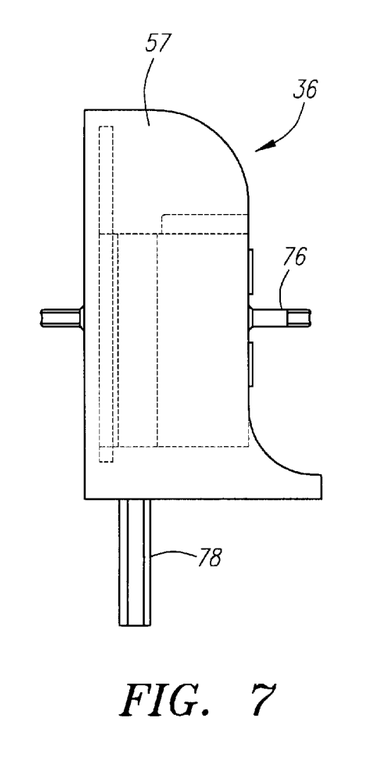
FIG. 7 is an isolated front view of the encoder slide mechanism of the apparatus of the present invention.
Figure 8:
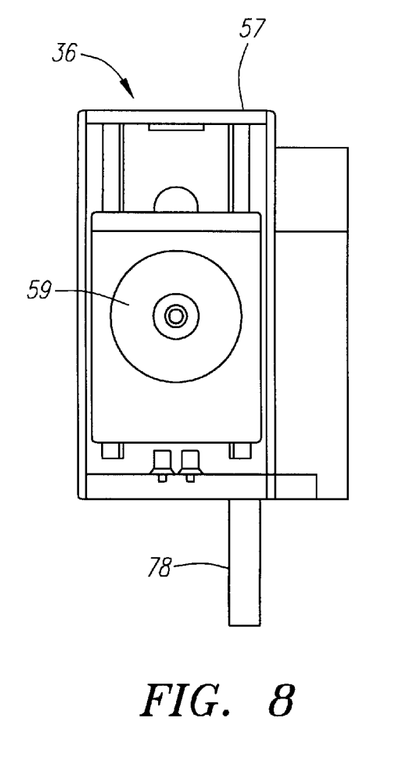
FIG. 8 is an isolated side view of the encoder slide mechanism of the apparatus of the present invention.
Figures 9, 10, 11:
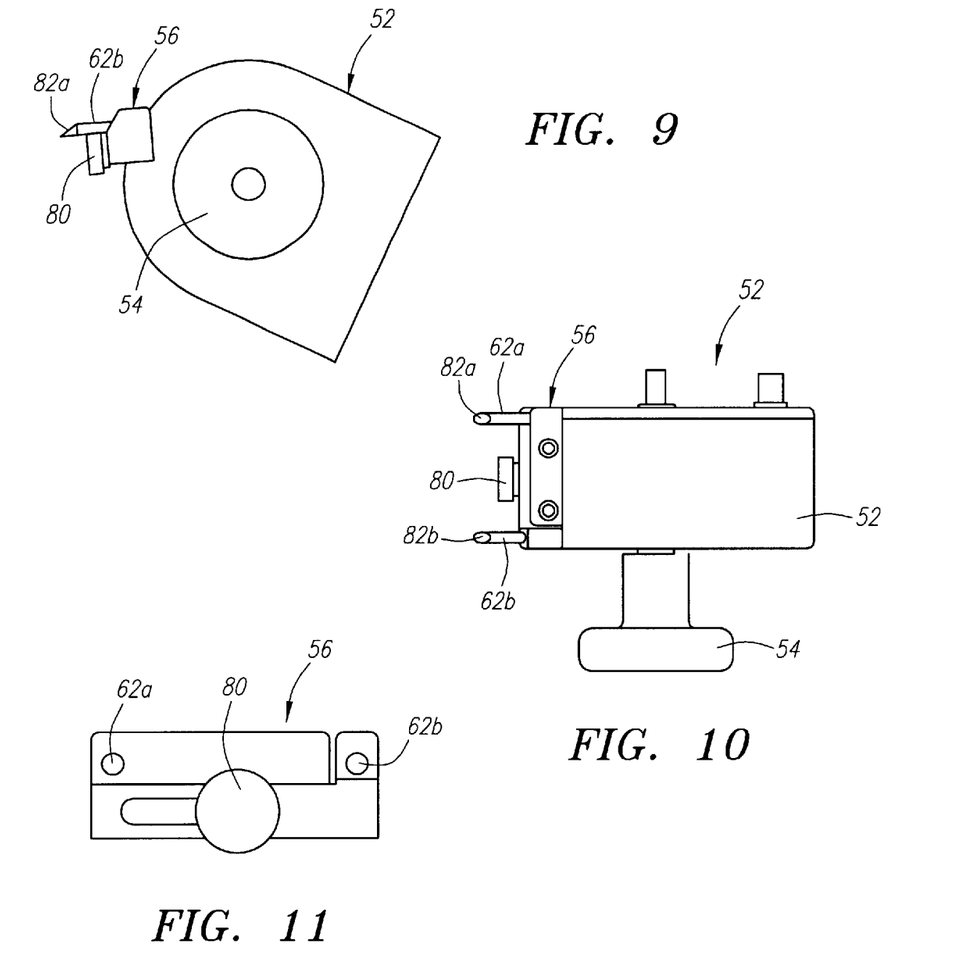
FIG. 9 is an isolated front view of the encoder mechanism of the apparatus of the present invention.
FIG. 10 is an isolated top view of the encoder mechanism of the apparatus of the present invention.
FIG. 11 is an isolated front view of the lie pins of the encoder mechanism in a contracted position.
Figure 12:
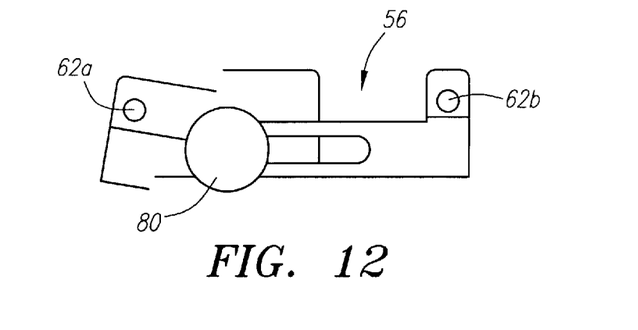
FIG. 12 is an isolated front view of the lie pins of the encoder mechanism in an extended position.

As shown in FIGS. 7–8, the sliding mechanism 36 of the encoder assembly 34 includes the rearward housing 57 which encloses a rotation rod 76 for actuating the lie measurement mechanism 56 from the lie rotation knob 59. The sliding mechanism 36 has a sliding guide 78 for controlling forward and rearward movement, relative to the golf club 50, of the encoder assembly 34 along the platform 32. The encoder assembly 34 is preferably an encoder that is moveable about five axes: 1) forward and rearward along an axis perpendicular to the face of the golf club 50; 2) laterally along an axis parallel to the face of a golf club 50; 3) oscillation or rotation upward and downward about an axis parallel to the face of the golf club 50; 4) oscillation or rotation about and axis perpendicular to the face of a golf club 50; and 5) upward or downward along an axis parallel to the shaft of the golf club 50.

As shown in FIGS. 9–14, the main components of the encoder assembly 34 are those that engage the golf club 50, specifically the face of the golf club 50. The lie measurement mechanism 56 is moveably connected to the forward housing 52. Lateral movement of the lie measurement mechanism 56 is controlled by the lie rotation knob 59, which is connected to the rearward housing 57. The lie pins 62a and 62b of the lie measurement mechanism 56 are capable of expansion and contraction along a horizontal plane in order to precisely, and easily measure the lie angle of a golf club 50. The expansion and contraction of the pins 62a and 62b toward and away from each other is controlled by lie pin control knob 80. Each of the lie pins 62a and 62b have tapered ends 82a and 82b for engaging the bottom surface of the scorelines of the face of the golf club 50 in order to measure the lie angle.

Figures 13, 14, 15, 16:
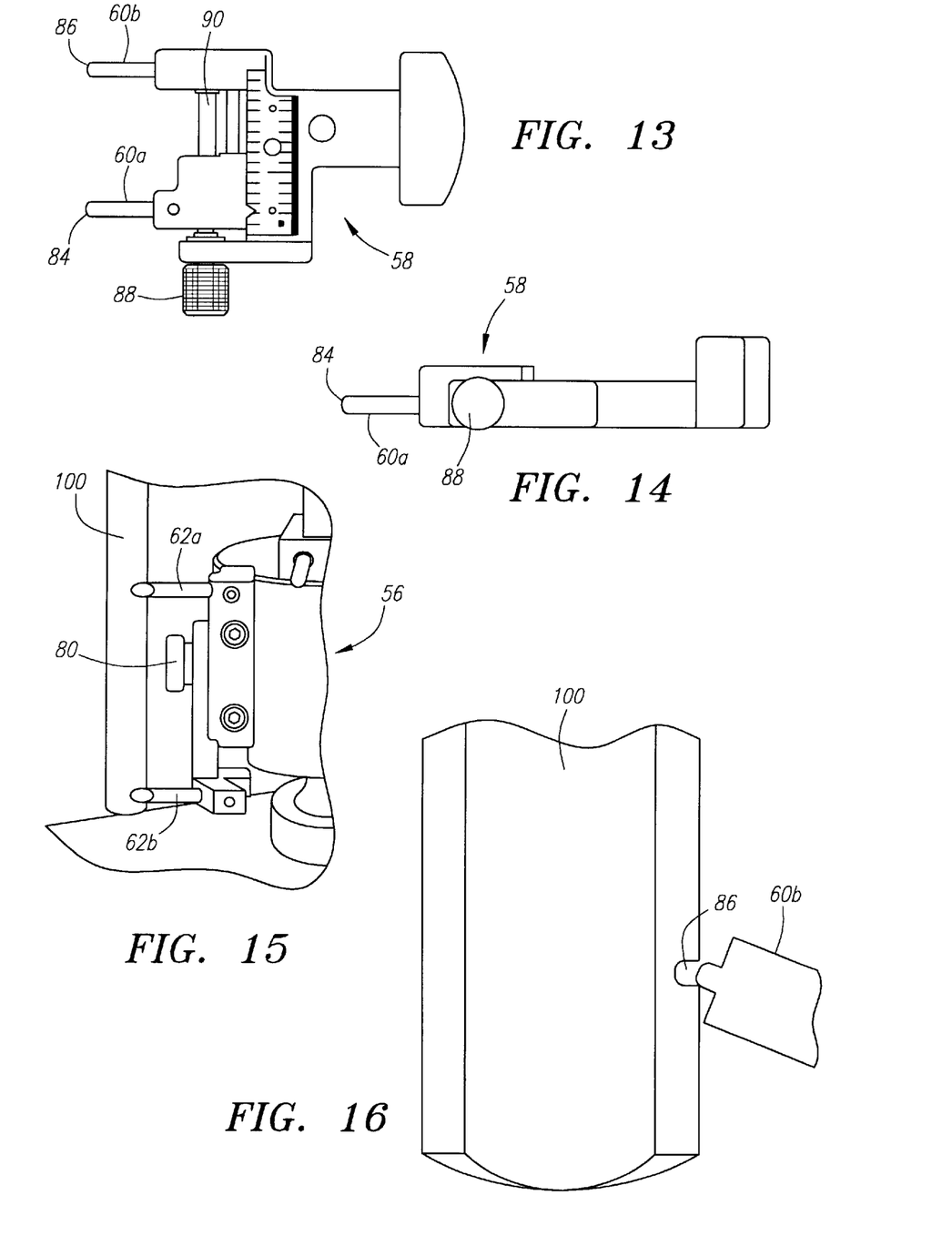
FIG. 13 is an isolated top view of the loft pins of the encoder mechanism.
FIG. 14 is an isolated side view of the loft pins of the encoder mechanism.
FIG. 15 is a front view of the lie pins of the encoder mechanism engaging a calibration rod.
FIG. 16 is a front view of a loft pin of the encoder mechanism engaging a slot of the calibration rod.

As shown in FIGS. 13 and 14, the loft mechanism 58 is capable of expansion and contraction of the loft pins 60a and 60b through actuation by a loft pin control knob 88 that allows for movement along a rail 90. The pins 60a and 60b move away and toward each other in order to precisely measure the loft angle of the golf club 50. The pins 60a and 60b have different ends, unlike the lie pins 62a and 62b. The lower loft pin 60b has a tip end 86 that engages the scoreline of the face of a golf club 50. The tip end 86 is designed to fit within a scoreline. The upper loft pin 60a has a blunt end 84 for engaging with the non-scoreline portion of the face. Sensors within the encoder assembly 34 determine the position of the loft pins 60a and 60b, and the position of the lie pins 62a and 62b to calculate the loft angle and the lie angle of the golf club 50. A preferred encoder assembly is a 10,000 step encoder from Dynamic Resource Corporation.

FIGS. 15–21 illustrate the method for measuring the loft angle and the lie angle of a golf club 50 using the apparatus 30. First, to calibrate the loft pins 60a and 60b and the lie pins 62a and 62b, a calibration rod 100 is secured within the securing mechanism 38. The calibration rod is preferably a cylindrical metal rod with beveled edges and a slot 101.

After securing the rod 100, the lie knob is rotated and the encoder assembly 34 is positioned until the lie pins 62a and 62b are in contact with the front facing flat of the calibration rod 100. The objective is to ensure full pin contact without moving the calibration rod 100. As shown in FIG. 15, the operator visually checks to ensure that the tips 82a and 82b of the lie pins 62a and 62b are in contact with the calibration rod 100. The operator then ensures that the reading is stable and resets the lie angle measurement to zero on the LED display of the lie angle. The lie is now set to zero for measurement of a golf club 50. The encoder assembly is then rotated rearward until the LED display reads 90 degrees +/−1 degree.

To calibrate the loft pins 60a and 60b, the loft mechanism 58 is rotated until the tip 86 of the lower loft pin 60b engages the calibration rod 100, as shown in FIG. 16. The tip 86 engages the slot 101 to calibrate the loft angle. The loft mechanism 58 is then rotated until the flat end 84 of the upper loft pin 60a contacts the calibration rod 100. The operator visually ensures that the lower loft pin 60b is still within the slot 101. The loft reading is then reset to zero on the LED display of the loft angle. The loft angle is now set at zero degrees. The loft calibrations may be repeated several times to ensure accuracy. The calibration rod 100 is removed, and the apparatus is ready to measure a golf club 50.

Figure 17:
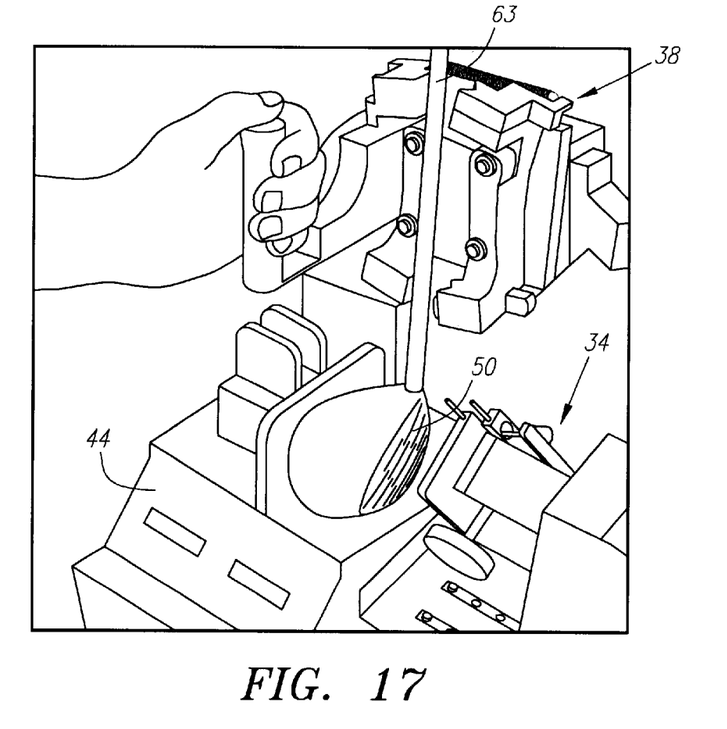
FIG. 17 is a top perspective view of a golf club secured within the apparatus of the present invention.
Figure 18:
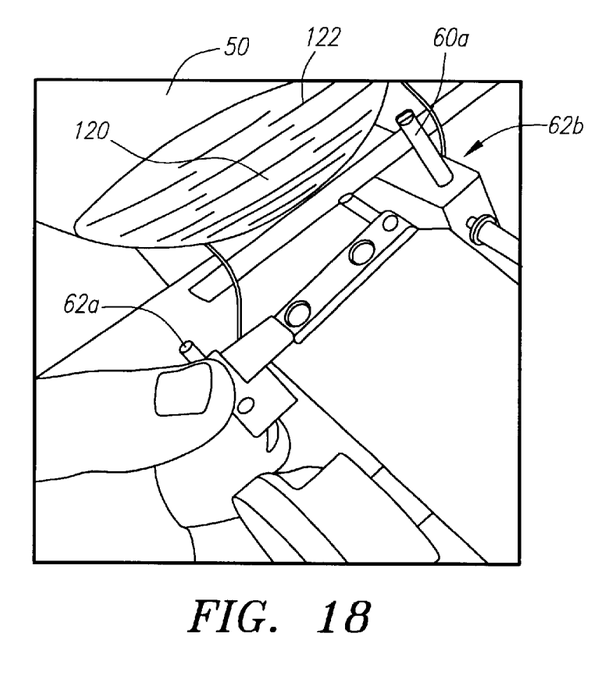
FIG. 18 is an isolated view of the alignment of the lie pins with the face of a golf club head.
Figure 19:
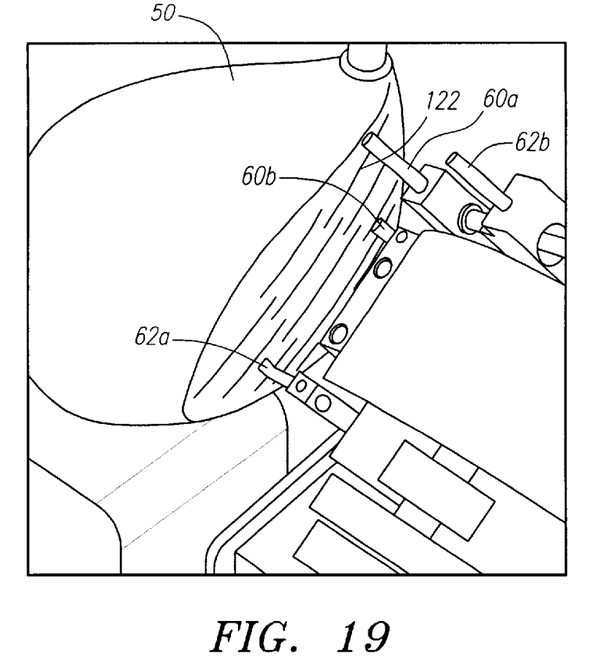
FIG. 19 is an isolated view of the engagement of the lie pins with the bottom surface of a scoreline of the face of a golf club head.

As shown in FIG. 17, a golf club 50 is placed within the apparatus 30 by first securing the shaft 63 with the securing mechanism 38. The adjustable back stop assembly 42 is moved forward to engage the golf club 50 in order to prevent movement of the golf club during the measuring process. The placement of the shaft must allow for the loft pins 60a and 60b to align with the center of the face 120 of the golf club 50. As shown in FIG. 18, the lie pin width is adjusted until the lie pins 62a and 62b fit into the desired scoreline 122 on the face 120 of the golf club 50. The face 120 of the golf club 50 must be square to the lie pins 62a and 62b. The encoder assembly 34 is moved forward and the lie pins 62a and 62b are rotated until the lie pins 62a and 62b are in the center of the scoreline 122. As shown in FIG. 19, the lie pins 62a and 62b are then centered heel to toe using the ends of the scoreline 122 as a reference. The lie pins 62a and 62b are then positioned to engage the bottom of the scoreline 122. The operator then monitors the LED display of the lie angle to wait for a stable value. The stable value is then recorded and compared to a value for that particular golf club 50. The value may also be transmitted to a computer for recordation and comparison to an entire set of golf clubs being measured by on apparatus 30.

Figure 20:
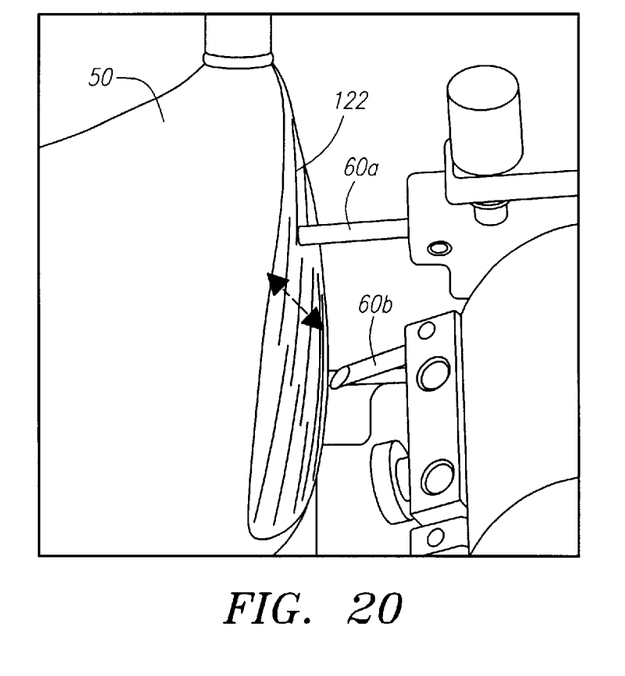
FIG. 20 is an isolated view of the alignment of the loft pins with the face of a golf club head.
Figure 21:
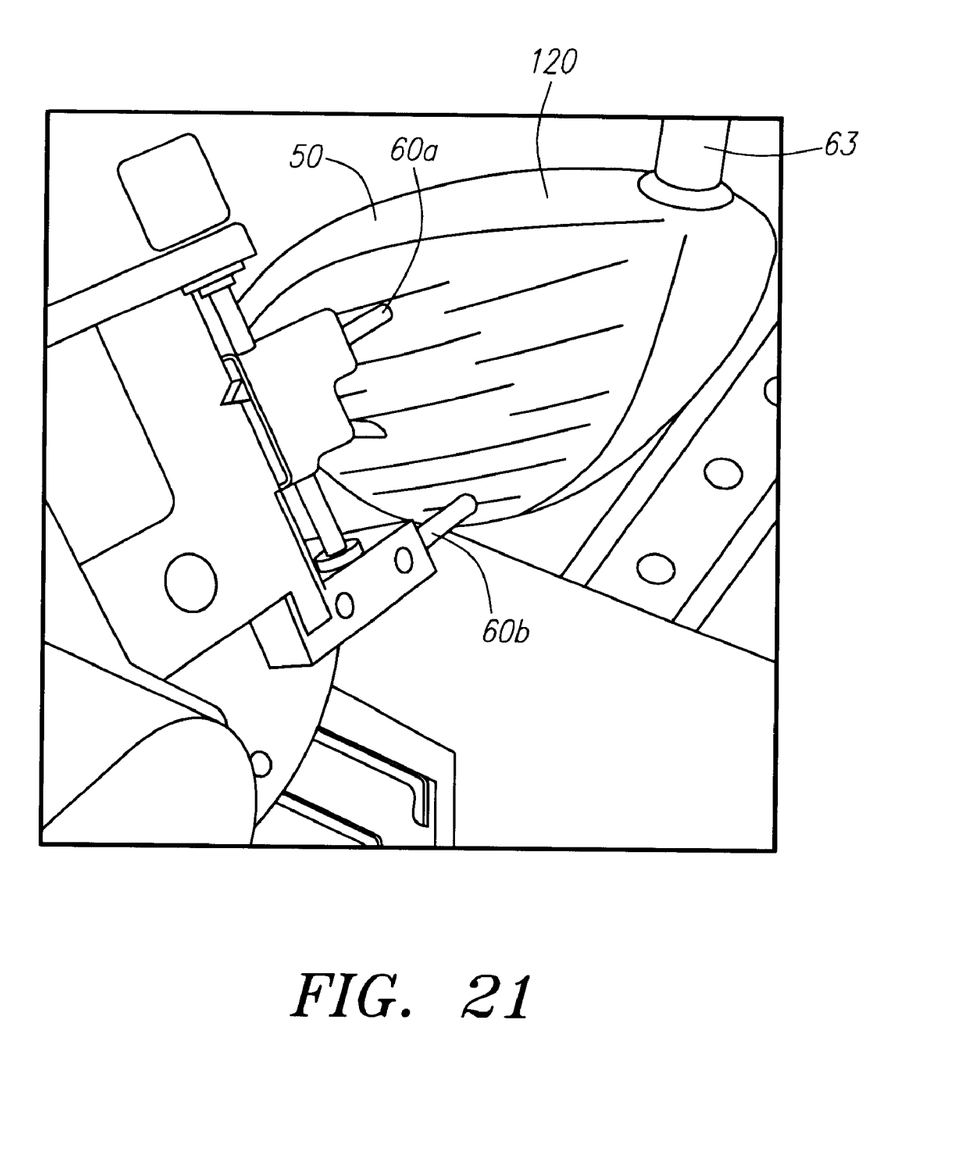
FIG. 21 is an isolated view of the engagement of the loft pins with the face of a golf club head.

To measure the loft angle, the loft pin height of the loft mechanism 58 is adjusted in order to locate the upper lot pin 60a just below the top scoreline 122 when the tip 86 of the lower loft pin 60b is engaged within the bottom scoreline 122, as shown in FIG. 20. The pins 60a and 60b are then centered heel to toe using the ends of the scorelines 122 as references, as shown in FIG. 21. Pressure is exerted until the lower loft pin 60b is resting on the bottom surface of the bottom scoreline 122. When the loft reading is stable on the LED display of the loft angle, the value is recorded and compared to known values for the particular golf club 50. The loft and lie angles are measured and the golf club head 50 may be removed from the apparatus 30.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim as my invention:

1. A method for measuring the loft angle and the lie angle of a golf club having a plurality of scorelines, the method comprising:

placing a golf club within a measuring device, the plurality of scorelines of the golf club facing toward an encoder of the measuring device;

aligning a plurality of lie pins of the encoder with a scoreline of the plurality of scorelines;

engaging the plurality of lie pins with the surface of the scoreline;

measuring the lie angle of the golf club and recording the lie angle electronically;

aligning a first loft pin of the encoder with at least one scoreline of the plurality of scorelines and aligning a second loft pin with a face of the golf club;

engaging the first loft pin with the surface of the scoreline, and the second loft pin with the surface of the face of the golf club; and measuring the loft angle of the golf club and recording the loft angle electronically.

2. The method according to claim 1 wherein the plurality of lie pins are aligned and engaged with a bottom surface of a bottom scoreline of the plurality of scorelines.

3. The method according to claim 1 wherein the first loft pin engages with a bottom surface of a bottom scoreline of the plurality of scorelines and the second loft pin engages with the surface of the face.

4. The method according to claim 1 wherein placing the golf club within the measuring device comprises aligning the golf club equal to addressing a golf ball, and securing the golf club to prevent movement during the measuring method.

5. The method according to claim 4 wherein the golf club is secured by clamping a shaft of the golf club within a clamp of the measuring device.

6. The method according to claim 1 wherein each of the plurality of lie pins is a cylindrical rod with a tapered end.

7. The method according to claim 1 wherein the encoder is a capable of movement along five axes.

8. The method according to claim 1 wherein the golf club is a wood or iron.

9. The method according to claim 1 further comprising comparing the measured loft and lie angles with predetermined loft and lie angles for the golf club.

10. An apparatus for measuring loft and lie angles of a golf club, the apparatus comprising:

a platform;

means for securing a golf club in an address position, the securing means disposed on the platform;

an encoder having a loft angle measurement mechanism and a lie angle measurement mechanism, the encoder capable of five axial movements for engagement of each of the loft angle measurement mechanism and the lie angle measurement mechanism, the loft angle mechanism having a plurality of loft pins and the lie angle mechanism having a plurality of lie pins; and means for transmitting loft angle and lie angle measurements for recordation.

11. The apparatus according to claim 10 wherein the securing means is a clamp for retaining the shaft of a golf club.

12. The apparatus according to claim 10 further comprising an LED display for displaying the loft angle and lie angle measurements.

13. The apparatus according to claim 10 wherein the plurality of loft pins are mounted on a frame capable of oscillation of at least 180 degrees about a first fixed axis, and the plurality of lie pins are mounted on a frame capable of oscillation of at least 180 degrees about a second fixed axis.

14. The apparatus according to claim 10 wherein each of the plurality of loft pins have a tapered end for engaging the face of a golf club.

* * * * *